Nov. 20, 1945. H. B. LINDSAY Re. 22,693
PREFABRICATED STRUCTURE FOR CONTAINERS AND THE LIKE
Original Filed June 7, 1943 2 Sheets-Sheet 1
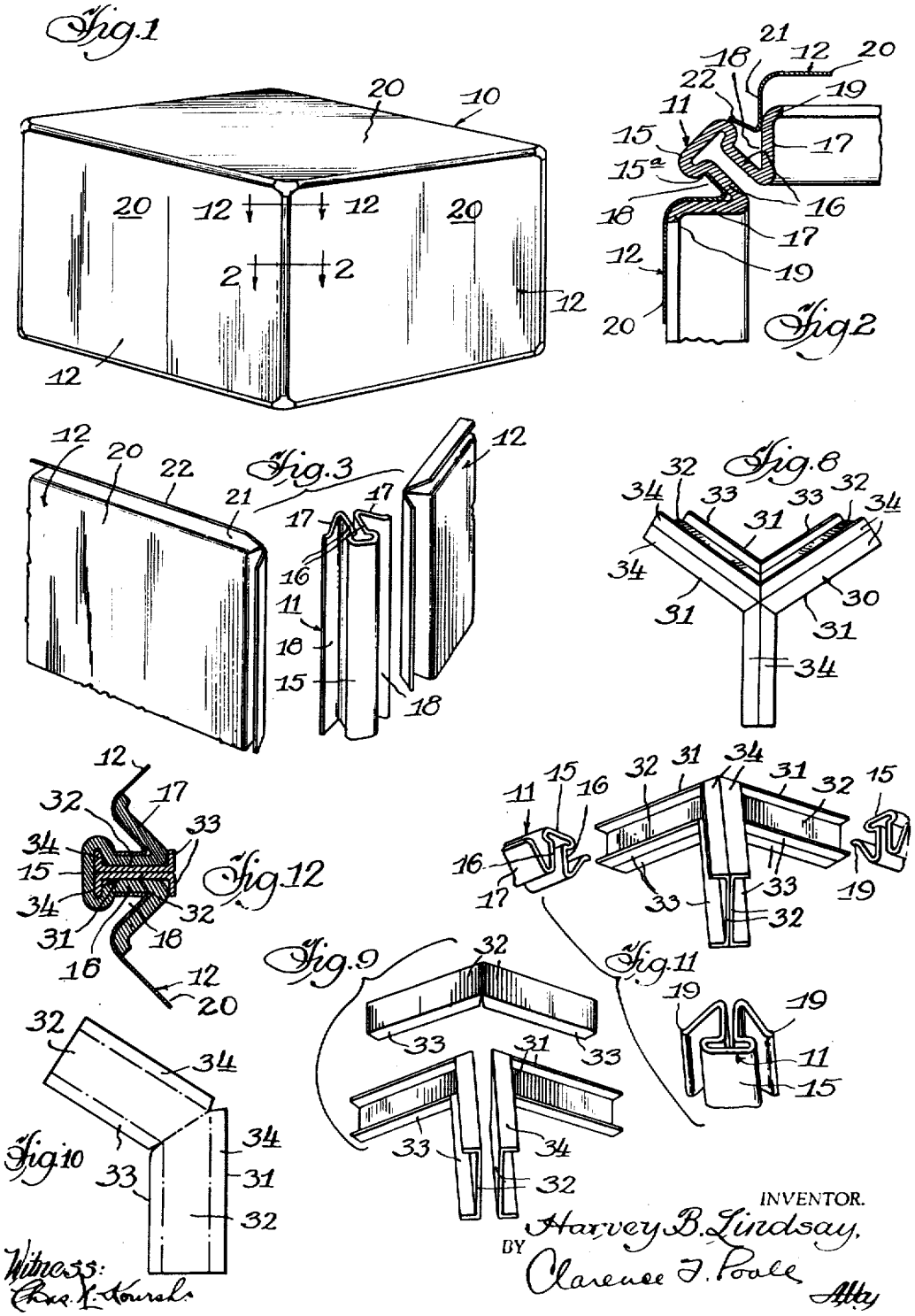

PREFABRICATED STRUCTURE FOR CONTAINERS AND THE LIKE

Original Filed June 7, 1943 2 Sheets-Sheet 2

INVENTOR.
Harvey B. Lindsay
BY Clarence F. Poole
Atty

Witness:
Chas. R. Komsch.

Reissued Nov. 20, 1945

Re. 22,693

UNITED STATES PATENT OFFICE 22,693

PREFABRICATED STRUCTURE FOR CONTAINERS AND THE LIKE

Harvey B. Lindsay, Evanston, Ill., assignor to Lindsay & Lindsay, Chicago, Ill., a partnership Original No. 2,364,083, dated December 5, 1944, Serial No. 489,888, June 7, 1943. Application for reissue February 10, 1945, Serial No. 577,251

14 Claims. (Cl. 189—34)

This invention relates to improvements in prefabricated structures of relatively light weight made of metal or other materials, adapted for containers, boxes, partitions, housings, furniture, and similar structures, consisting primarily of polygonally disposed frame members enclosed by relatively thin sheet panel members.

Among the objects of the invention is to provide a structure consisting of frame members and panel members, all of simple form, which can be made up in predetermined shapes and sizes for structures of various kinds, and shipped in knock-down condition, whose costs will be relatively low, and which on assembly will provide structures of sufficient strength and rigidity for the purposes above suggested.

A further object is to provide a self-fastening structure of the character described, which may be assembled without the use of any bolts, screws, nails, rivets, or welding means. Instead, the sheets are attached to the framing by means of a novel interlocking configuration of sheets and framing, whereby the sheets are gripped or locked in place and become firmly secured to the framing, so as to tie the entire structure together. The locking means is such that the rigidity and gripping effect is increased by the application of normal stresses on the structure.

Other objects and advantages will appear from time to time as the following description proceeds.

The invention may best be understood by reference to the accompanying drawings, in which—

Figure 1 is a perspective view showing an enclosed container made in accordance with my invention;

Figure 2 is an enlarged detail section taken on line 2—2 of Figure 1, but with the exterior corner trim removed, to illustrate the essential or basic structural elements, consisting of a frame member and panels, and showing the method of assembly or connection of the panels thereto;

Figure 3 is a perspective view showing fragmentary portions of the frame member and panels before assembly;

Figure 8 is a perspective view of a corner fastening structure especially adapted for connecting the meeting ends of three frame members at the corner of a rectangular structure;

Figure 9 is a perspective view showing in expanded relation the arrangement of the three component parts of the structure shown in Figure 8;

Figure 10 is a plan view of a blank sheet metal fastening member from which is formed each of the three component parts of the fastening structure shown in Figures 8 and 9;

Figure 11 is a perspective view illustrating the method of assembly of the frame members and the three component parts of the corner fastening structure shown in Figure 8, by inserting the projecting arms of said corner fastening structure into the ends of the frame members;

Figure 12 is an enlarged detail section taken on line 12—12 of Figure 1 to show a portion of the corner fastening assembly, after it is inserted within the adjacent end of one of the frame members;

Figure 4:
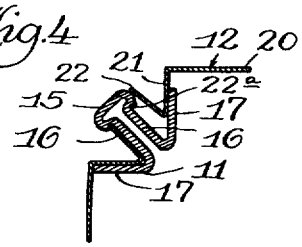
Figure 4 is a transverse sectional view drawn on a somewhat smaller scale than Figure 2, showing a modified form of frame member and corresponding panel structure.

Referring now to details of the embodiment of my invention illustrated in the drawings, a typical rectangular container constructed in accordance therewith is indicated at 10 in Figure 1. The principal elements which go to make up the structure are shown in detail in Figures 2 and 3 and consist of a plurality of frame members indicated generally at 11 and panel members indicated generally at 12. The frame members 11 are suitably connected together at their ends, as will hereinafter be described in detail, to form an open framework of generally rectangular shape. The panel members 12, 12, forming the outer walls of the structure, are provided with flanged margins having interlocking engagement with the frame member.

The means affording interlocking engagement between the margins of the panels 12 and each proximate frame member 11 is provided in the following manner, as illustrated in Figures 2 and 3. The frame member 11 consists essentially in a length of relatively stiff material, such as sheet metal, which is formed by bending the strip longitudinally upon itself so as to provide a centrally disposed C-shaped head 15, a pair of laterally spaced parallel webs 16, 16, extending inwardly from the opposed inner ends of the C-shaped head 15, and a pair of reversely bent, outwardly extending webs 17, 17, disposed at equal angles from the inner ends of their respective webs 16, 16. The webs 16 and 17 thus form a pair of outwardly opening V-shaped grooves 18, 18 in the frame member 11, along opposite sides of the head 15. The two outer webs 17, 17 are disposed substantially at right angles to each other, and their connecting webs 16 are arranged at an angle of about 45 degrees thereto.

In the form of frame member shown in Figures 2 and 3, it will be noted that the outer ends of the webs 17 are somewhat longer than the adjacent web 16, and that the free ends of the outer webs 17 terminate slightly beyond the head 15 when measured in lines projected perpendicularly of said outer webs 17, 17. The free ends of each of the webs 17, 17 are curved outwardly to form a relatively short flange 19.

Each of the panels 12, 12 consists of a flat body portion 20 of sheet metal, which is surrounded by an inner flange 21 and an outer flange 22 arranged at a reverse acute angle to the flange 21. The inner flange 21 is disposed at an angle of approximately 90 degrees to the body 20 and the outer flange 22 is normally disposed at an angle of slightly more than 45 degrees from the flange 21. The two flanges 21 and 22 are preferably formed by press drawing the margins of the sheet metal panel in the usual manner between male and female dies of the proper shapes.

The arrangement is such that the acute-angled flanges 21 and 22 will fit snugly in an adjacent V-shaped groove 18 of the frame member 11. The outer flange 22 is of such length as to engage the inner web 16 of said frame member, with its outer or free end fitting beneath and engaging the overhanging shoulder 15a formed by the C-shaped head 15, as shown in Figure 2. As previously stated, the outer flange 22 of panel 20 is disposed normally at an angle slightly greater than 45 degrees to the flange 21. The arrangement is such that when the flanges 21 and 22 of the panel are inserted in the V-shaped groove 18 under moderate pressure, the flange 22 will snap into place immediately and become locked under tension beneath the shoulder 15a of frame member 11, as indicated in Figures 2 and 4.

To cause this effect of flange 22 snapping into place without permanently deforming the angle between flanges 21 and 22, the overhang of shoulder 15a (measured on a line parallel to web 16) is preferably not greater than fifteen per cent of the length of flange 22, nor less than one and one-half times the thickness of said flange. The corner formed by the junction of the outside faces of the web 16 and the shoulder 15a (or a tangent thereto), is preferably an angle of not more than 90 degrees, as shown in Figure 2. Figure 4 shows a modification in which a very shallow groove 22a is formed in the surface of the shoulder contiguous to said corner, such groove having a width very slightly wider than the thickness of the edge of flange 22.

It will be especially noted that when the acute-angled flanges of the panel 12 are locked in the frame member, they are securely held against accidental displacement therefrom. Any forces which ordinarily may be exerted on the panel 12 will tend to increase the gripping action of the locking flanges in the groove 18, rather than release them. For instance, any stresses on the panel 12 in an outward direction parallel to the web 17 will tend to grip or wedge the outer flange 22 in tighter engagement against the overhanging shoulder 15a. Similarly, any stresses exerted on the panel in a plane perpendicular to the web 17, either toward or away from the frame member 11, will also produce an increase in the wedging action of the V-shaped flanges in said frame.

It is also to be noted that (particularly in the case of very thin metal or other less stiff sheet material) the junction between flanges 21 and 22 should be a sharp bend rather than a curve of larger radius; also that flanges 21 and 22 should be flat, not curved; these for the reason that under severe tension metal (and other materials) will "follow" and so pull out round a curve, but cannot do this and will remain fixed and rigid at a point of sharp acute bend.

Figure 4 shows a modified form of frame member 11, wherein the free ends of the outer webs 17, 17 terminate in squared extremities, instead of outwardly curved ends of flanges 19, as shown in Figures 2 and 3. I find in practice that the provision of the curved ends 19, 19 of Figure 2 has certain advantages, since it presents a curved, rather than a relatively sharp, cutting edge to the panel. Also the flange 21 joins the panel 20 with a curved, rather than a sharp corner, which may have a tendency to weaken the panel structure, and this curved corner serves to increase the pressure of flange 22 against web 16 (and consequently the pressure of the free edge of flange 22 into the corner of web 16 and shoulder 15a), upon tensional stresses being set up in sheet body 20 tending to pull the sheet from the framing. Moreover, the curved end 19 of Figure 2 permits a limited variation in the relative depths of the locking flange 21 and the groove 18, in case minor inaccuracies may occur in the initial formation of these interlocking parts.

Figure 5:
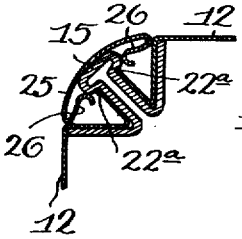
Figure 5 is a sectional view of the frame and panel structure of the type shown in Figure 4, but with a snap-on edge trim member also applied to the framework.

Figure 5 shows a corner frame structure, including a finishing strip or filler 25, which may be formed of a length of sheet metal having its ends 26 bent rearwardly in S-like shape so as to be detachably engaged beneath the opposite sides of the head 15. When assembled in this manner, the finishing strip presents a curved edge surface substantially flush with the panels 12, 12 and filling the space at opposite sides of the head 15. Such an edge finishing strip 25 is provided mainly for enhancing the appearance or attractiveness of the structure.

Figure 6:
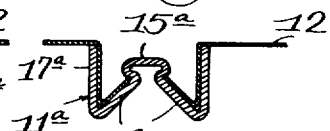
Figure 6 is a sectional view showing a modified form of frame member which may be employed as an intermediate support between two panels disposed in the same plane.

Figure 6 shows a modified form of frame member, indicated at 11a, which is particularly designed for use as an intermediate cross brace to support two continuous sections disposed in the same plane. It will be observed that the intermediate frame member 11a has a head 15a and webs 16a and 17a, which are essentially of the same shape as the corresponding head and webs of the corner frame member 11, respectively, excepting that the webs 16a, 16a are spread apart at an angle of approximately 90 degrees to each other, instead of being parallel to each other, as in the case of the corner frame members 11. Actually this frame member is preferably frame member 11 press-spread from center 90 degrees.

Figure 7:
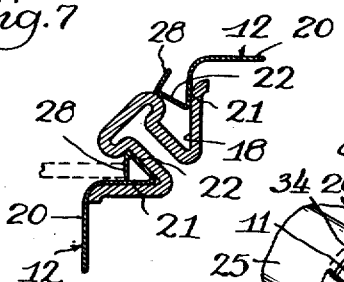
Figure 7 is a transverse detail view similar to Figure 2, but showing an additional flange-locking arrangement for the panel members, which is capable of being more positively locked or unlocked by means of a tool, when desired.

Figure 7 illustrates a modified form of panel fastening, having locking means, consisting of a terminal flange 28 formed at the end of the outer flange 22 of the panel 12. The terminal flange 28 is initially formed substantially at a right angle to the outer flange 22, as shown in the upper part of Figure 7. After the flanges 21 and 22 have become seated in the V-shaped groove 18, however, the terminal flange 28 may be depressed by means of a suitable tool, indicated in dotted lines in the same figure, so that the squared free edge of the locking flange 28 will become engaged with the opposed surface of the flange 21 at right angles to the latter, as clearly shown in this figure.

The flange 28 is made of such length that its squared outer end will be maintained under tension in upright locking position relative to the opposed flange 21, as shown. Said locking flange can be readily released by using a suitable tool, either by forcing the flange 28 inwardly, or by prying the edge of said flange outwardly from its upright locking position.

The locking flange 28 is advantageous in cases where a tightly sealed joint is desired, and also in cases where the structure is to be dismantled or disassembled from time to time, without injury to the interlocking flanges of the panels. It is especially useful in cases where its panel is to be employed as a removable closure for the container.

It will be manifest that any one of the various modified forms of detachable snap-in connections comprising flanges 21 and 22, fitting in a receiving groove 18, as hereinbefore described can be utilized for joining a single panel or similar structural member to any other connecting member. Therefore, insofar as the snap-in connection means are concerned my invention is not necessarily limited to the use thereof for joining any particular form or kind of panel sheet, nor to any particular form or kind of frame member.

Referring now more particularly to the means for connecting the meeting ends of the frame members 11, 11 at the corners of the container 10, a preferred form of fastening device 30 is shown in Figures 8 to 11, and is made up of three similar sheet metal angle pieces 31, 31. Each of said angle pieces is made from a blank of sheet metal cut in the form shown in Figure 10, wherein two similar wings 32, 32 are initially formed at an angle of 120 degrees to each other. The two wings 32, 32 of each angle piece are bent at an angle to each other, and inner and outer marginal flanges 33, 33 and 34, 34 are also bent inwardly along their outer sides, as clearly shown in Figure 9.

Three similar angle pieces 31, all formed in the same manner, are nested together, in back-to-back relation, as indicated in partially assembled position in Figure 9 and in fully assembled position in Figures 8 and 11, with the wings 32 of each of said angle pieces in registering engagement with one wing 32 of each of the other two angle pieces.

With the three angle pieces assembled as shown in Figures 8 and 11, the three frame members 11 are attached thereto by inserting each pair of wings 32, 32 in the slot formed between the opposed webs 16, 16 at the end of one of said frame members. As will be seen in Figure 12, the outermost pair of flanges 34, 34 is adapted to fit snugly within the C-shaped head 15 of the frame member, and the lowermost pair of flanges 33, 33 is engaged with the adjacent inner ends of the webs 16, so as to hold the three frame members 11 connected to each corner fastening device against lateral displacement relation to said fastening device 30 and to each other.

The method of assembly of a structure consisting of the elements hereinabove may now be described as follows: The framework is first assembled by applying the ends of the frame member 11, 11, cut to proper lengths, to the assembly corner fastening devices 30, each made up of three angle pieces 31, as previously described. When the framework is completed, the panels 20, 20 are applied to the open framework by snapping the locking flanges 21, 22, in the proper position relative to the grooves 18 formed along the frame members.

When the panels 20 are thus applied to the structure it will be understood that they will hold the frame members 11, 11 from endwise withdrawal from the corner fastening devices 30, 30, and tie the entire structure together. Accordingly, the several parts co-operate to form a unitary structure which will be maintained in assembled form without the use of any extraneous fastening devices, such as bolts, screws, or the like.

A structure made in accordance with my invention exhibits great strength and resistance, particularly in view of the lightness of the parts which may be employed in the construction of the frame members 11, and particularly the panels 12. It will be understood that the frame members 11 are preferably formed of heavier gauge metal, or stiffer material, than the panels 12, so as to provide the desired strength of the entire structure, as well as to resist distortion of the locking grooves 18, 18 under excessive stresses.

Finally, the edge trim members 25, 25 may be applied to the unitary structure, as previously described in connection with Figure 5.

Rigidity and lack of give or "working" are essential in the purposes of this invention and consequently the support given the lighter sheet by the stouter frame over the entire fastening area, prevents any give or collapse of the former in this vital area.

It is important to note that under stresses tending to drag the sheet flanges 21 and 22 out of the frame grooves 18, the importance of the flanges (particularly flange 22) being flat, is at once apparent. In this case the outward tension exerted on the flange 21 immediately causes a compressing or wedging action of flange 22 between the inner face of web 17 (near the bottom of the V) and the flange-edge abutment against shoulder 15a. The flange 22, being itself plane in the plane of compression, will stand tremendous compression stress for its thickness without bending or collapse. Hence, this prevents any loosening of the sheet and consequent working and collapse of the structure.

If, on the other hand, flange 22 be curved or bent it would stand relatively speaking no compression force, and in addition the thin sheet metal or similar material would readily "follow"

any severe tension by drawing round the curve and out.

It should also be noted that the relatively light sheet material 12 in my invention, in conjunction with the above, is positively supported against loosening under stress, by the outer edge of the web 17 of the relatively stout frame member. Any give of the sheet at this point would likewise result in "working" and eventual collapse of the structure.

Figure 13:
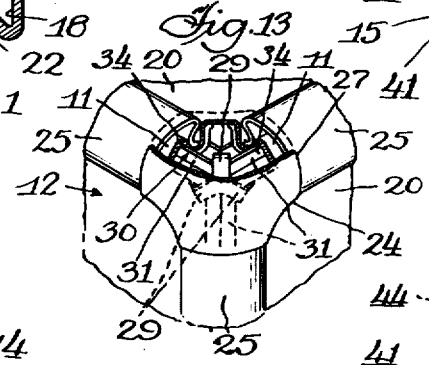
Figure 13 is a perspective view of the corner assembly, but showing an outer corner cap member which is applied thereto.

Figure 13 shows in detail a form of corner cap member 24 which may be employed to cover the exterior of each corner of the structure after the latter has been assembled. In the form shown, said corner member consists of a partially spherical piece of sheet metal 27 which is formed to fit over and enclose the space between the meeting corners of the panels 20, 20 at each corner of the structure. Said corner trim member has a plurality of yielding inwardly extending fingers 29, 29 attached on its under face, adapted to be snapped into engagement on opposite sides of the outer flanges 34, 34 of the adjacent corner fastening members 30, 30, after the frame members 11, 11 have been attached to the latter, and the panels 20, 20 have been applied to the structure. The corner trim members 24 and edge trim members 25 thus provide a finished appearance to the structure, and help to protect the edges and corners of the structure from injury. The composite structure is able to withstand exterior and interior stresses to an astonishing degree, in the many uses to which a container or similar structure of this character may be employed.

Figure 14:
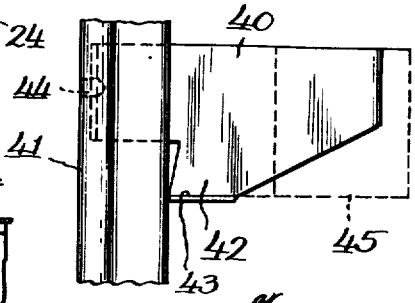
Figure 14 is a transverse section showing the arrangement of a container provided with both inner and outer walls, constructed in accordance with my invention.
Figure 15:
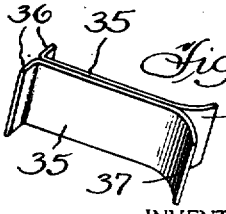
Figure 15 is a detail perspective view of the corner cross brace member shown in Figure 14.

It will also be understood that a double walled container may be made in accordance with the structural principles heretofore described and shown, as illustrated in Figures 14 and 15.

In Figure 14 the outer wall is made substantially as hereinbefore described, including corner frame members 11, intermediate frame members 11*a*, and outer panel members 12, 12. The inner wall is constructed with cross frame members 11*b*, which are substantially of the same cross-sectional shape as the intermediate frame members 11*a*. Where another intermediate frame member is required in the inner wall, it may also be of the same form as the intermediate frame member 11*a* used on the outer wall, as clearly shown in Figure 14.

The inner panels 12*a*, 12*a* will be similar in construction to the outer panels 12, excepting that the locking flanges 21*a*, which are to be engaged with an inner corner frame member 11*b*, will normally be formed at an angle of approximately 45 degrees to the body portion of the panel 12*a*, instead of at right angles thereto.

Suitable means are provided for spacing the adjacent inner and outer corner frame members 11 and 11*b* at a proper distance from each other. In the form shown in Figures 14 and 15, said spacing means consists of a pair of bars or straps 35, 35, which project in the slot between the webs 16, 16 of the outer frame member 11. Said bars also have outwardly flanged ends 36, 36, which are adapted to fit in the C-shaped head 15 of said outer frame member 11, and outwardly flared inner ends 37, 37, which engage in the slots at the opposite ends of the C-shaped head 15*a* of the inner frame member 11*b*, as clearly shown in Figure 14. The two bars or straps 35, 35 are applied in back-to-back relation to the frame members 11, 11*b*, by slipping them into the ends of said frame members. A plurality of such straps may be provided. If it is desired to hold said straps at predetermined points along the frame members, said straps may be anchored, as by means of a set-screw 39, threaded through the outer face of the C-shaped head 15 of frame member 11.

The two intermediate frame members 11*a*, 11*a* may be spaced by somewhat similar bars or straps 35*a*, 35*a*, having their diverging outer ends engaged in the heads 15*b* of said frame members, in substantially the same manner as heretofore described in connection with the inner corner frame member 11*b*.

Figure 16:
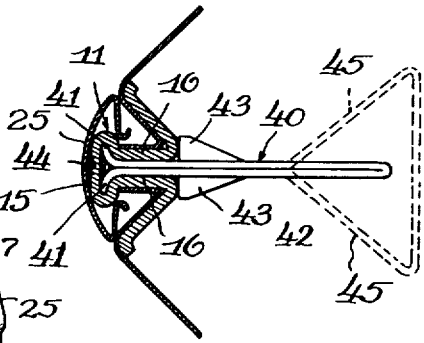
Figure 16 is a transverse detail section showing a novel form of support or hanger which may be employed with the outer corner frame members of my structure, so as to provide a support for a shelf or other partition members within the structure.
Figure 17:
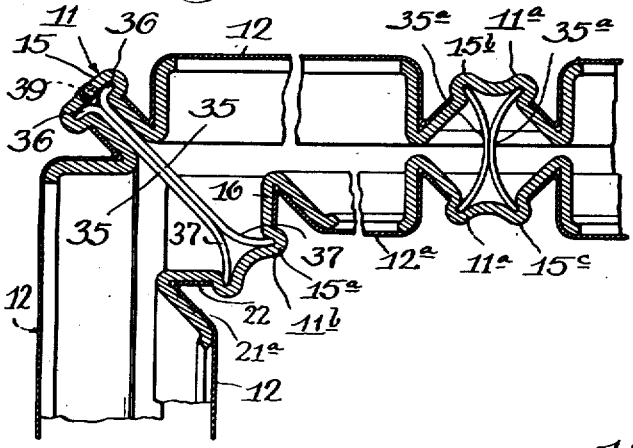
Figure 17 is a side view of the support or hanger shown in Figure 16.

Figures 16 and 17 illustrate how the outer corner members 11 may also be utilized for detachably mounting a suitable support for partition members or trays which may be employed within the container. As shown in Figure 16, such a support is indicated at 40 and consists of a piece of sheet metal which is bent upon itself and provided with a pair of flanges 41, 41, extending outwardly from each other at one end thereof, so as to fit between the webs 16, 16 of the frame member 11, with the end flanges 41, 41 engaged within the C-shaped head 15.

Said support is also provided with a depending portion 42 having laterally extending flanges 43, 43 connected therewith. These flanges are adapted to engage the adjacent inner faces of the frame member 11 as shown in Figure 17, so as to resist vertical stresses upon the support 40 and normally hold the support at any desired point. The support 40 may therefore be slidably adjusted along the frame member 11 to any desired level. Said support may also be anchored at any desired point, as by a set-screw indicated at 44, extending through the outer face of the C-shaped head 15 into engagement with the proximate faces of the flanges 41, 41 of said support.

The support 40 may also be made in different shapes, as, for instance, indicated in dotted lines at 45, 45, wherein the projecting portion of said support may be extended laterally into a triangular form if desired.

Although I have shown and described a preferred embodiment of my invention, it is to be understood that I do not wish to be limited to the exact embodiment of the device shown, which is merely by way of illustration and not limitation, as various other forms of the device will, of course, be apparent to those skilled in the art without departing from the spirit of the invention and scope of the claims.

I claim:

1. A composite structure comprising a panel and a cooperating connected member, said connected member having a groove formed with two opposed side walls, the side wall of the groove farthest from the intended position of the panel having an overhanging shoulder therealong defining with the opposed wall a relatively wide opening for said groove and said panel being provided with two acute-angled flanges formed along its margin transversely of said panel, and having wedge-fitting engagement in said groove by the initial insertion of the apex of said flanges and the subsequent engagement of, the free edge of the outer flange beneath said shoulder by expanding tension of said flanges.

2. In a composite structure comprising a panel and a cooperating connected member, the panel having two substantially flat relatively yieldable flanges along its margin and arranged at an acute angle to each other, the inner flange being disposed transversely of said panel, and the free edge of the outer flange being disposed beyond its respective inner flange and panel, the connected member having an outwardly facing groove formed therein, with two relatively non-yieldable opposed walls, one wall of said groove having an overhanging shoulder engageable by the free end of said outer flange and flexing said outer flange toward the inner flange when the flanges are inserted in said groove, said shoulder also forming a locking abutment for the free edge of the outer flange and maintaining the inner flange against the opposite wall of the groove when the outer flange is pressed beyond said shoulder.

3. In a structure of the character described, a framework consisting of a plurality of frame members, and a plurality of panel sheet memforming the closed side walls of said structure, said frame members being formed with a plurality of grooves along opposite edges thereof, each of said grooves having outwardly flaring side walls, and the side wall of each groove farthest from the adjacent edge of said frame member having an overhanging shoulder therealong, defining with the opposed wall a relatively wide opening for said groove, and said panels being formed with interlocking flange means engageable in said grooves, each consisting of two reversely bent relatively yielding marginal flanges disposed at an acute angle to each other, both disposed transversely of said panel and fitting in one of said grooves by the initial insertion of the apex of said flanges and the subsequent engagement of the free edge of the outermost flange in locking engagement beneath the overhanging shoulder of its respective groove by expanding tension of said flanges.

4. In a composite structure including frame members and panel sheets, said frame members being formed of strip metal bent longitudinally to form an enlarged centrally disposed head, two similar web portions extending inwardly from said head, and a web portion bent outwardly from the inner end of each of said first-named webs to form a pair of grooves of generally acute angular cross-section, said head forming an overhanging shoulder along each of said grooves, and the margins of each of said panel sheets being provided with two acute-angled flanges fitting into one of said grooves, with the free edge of the outer flange in abutting engagement with the shoulder of said groove.

5. In a composite structure including frame members and panel sheets, said frame members being formed of strip metal bent longitudinally to form an enlarged hollow centrally disposed head, two similar web portions extending inwardly from said head and spaced from each other, and a web portion bent outwardly from the inner end of each of said first-named webs to form a pair of grooves of generally acute angular cross-section, said head forming an overhanging shoulder along each of said grooves and said panel sheets having correspondingly shaped acute-angled flanged margins fitting in said grooves, to provide interlocking engagement between said flanges and grooves, and said spaced webs having fastening members therebetween, with flanged extremities extending into said head.

6. In a composite structure comprising panel sheets, frame members and corner fastening structures, each of said frame members being formed of a strip of metal bent longitudinally upon itself to provide an enlarged head, a pair of laterally spaced inwardly extending webs connected to opposite sides of said head, and a terminal web bent outwardly from the inner end of each of said first-named webs to form a pair of V-shaped grooves, said corner fastening structures each comprising three similar angle pieces made of sheet metal and bent into shape so as to engage each other in back-to-back relation to form a single fastening unit with three arms disposed at right angles to each other to define a corner of the structure, the arms of said corner fastening structure having fitting engagement in the ends of adjacent frame members, and said panel sheets having flanged marginal edges having interlocking engagement in the acute-angled grooves formed in said members.

7. In a composite structure comprising panel sheets, frame members and corner fastening structures, each of said frame members being formed of a metal strip bent longitudinally upon itself to provide an enlarged head, a pair of laterally spaced inwardly extending webs connected to opposite sides of said head, and a terminal web bent outwardly from the inner end of each of said first-named webs to form a pair of V-shaped grooves, said corner fastening structures each comprising three similar angle pieces made of sheet metal and bent into shape so as to engage each other in back-to-back relation to form a single fastening unit with three arms disposed at right angles to each other to define a corner of the structure, the arms of said corner fastening structure having fitting engagement in the adjacent ends of adjacent frame members in the spaces between the inwardly extending webs thereof, and said panel sheets having flanged marginal edges having interlocking engagement in the acute-angled grooves formed in said frame members.

8. A composite structure comprising a panel and a cooperating connected member, said connected member of relatively stiff material having a groove formed therealong, having relatively non-yieldable opposed side walls, and the side wall farthest from the intended position of the panel having an overhanging shoulder therealong defining with the opposed wall a relatively wide opening for said groove, said panel having interlocking means formed along its margin including two substantially flat relatively yieldable locking flanges disposed at an acute angle to each other, both disposed transversely of said panel, and wedge fitting in said groove by the initial insertion of the apex of said flanges and the subsequent engagement of the free edge of the outer flange under expanding tension beneath the overhanging shoulder of said groove.

9. A composite structure comprising panel sheets having elastically bending characteristics similar to thin sheet metal, and relatively stiffer frame members, said frame members having uniform cross-section presenting two acute-angled flat-sided grooves, their adjacent wall members being spaced apart and joined together along their adjacent edges by an expanded portion forming a shoulder projecting into each groove on the adjacent sides thereof, and said sheets having two V-shaped flanges along their margins normally of less acute angularity than said grooves, said marginal flanges being disposed transversely of their respective sheets, and pressed into said grooves past said shoulders into snug fit therein with the free edges of said flanges in locking abutment against said shoulders.

10. In a composite structure, a frame member and a panel sheet, said frame member being formed of relatively stiff material including a groove formed therealong with outwardly opening relatively non-yielding side walls, and with a locking shoulder overhanging the edge of said groove farthest removed from the intended position of connection of said panel sheet, said panel sheet having two relatively yielding substantially flat oppositely bent flanges formed along its margin, both of said flanges being disposed transversely of said panel and having wedge-fitting engagement in the groove in said frame member by the initial insertion of the apex of said flanges and the subsequent engagement of the free edge of the outer flange beneath the shoulder by expanding tension of said flanges, so that pulling stresses acting in the plane of said panel sheet transversely of its inner flange tend to increase the locking action of its outer flange beneath said locking shoulder.

11. A composite structure including a panel sheet and a cooperating connected member, said connected member having an outwardly facing groove therealong formed of opposed relatively non-yielding side walls disposed at an acute angle to each other, and the side wall farthest from the intended position of the adjacent panel sheet having an overhanging shoulder therealong, said panel sheet having self-locking means cooperating with said groove, including two substantially flat flanges formed along its margin normally of less angularity to each other than the walls of said groove, both of said flanges being disposed transversely of said panel sheet and wedge-fitting into said groove past said shoulder by the initial insertion of the apex of said flanges and the subsequent engagement of the free edge of the outer flange beneath said shoulder by expanding tension of said flanges.

12. A composite structure comprising a plurality of relatively rigid frame members, and a panel member for forming a wall of said structure, each of said frame members having an outwardly-opening groove therealong with opposed relatively non-yieldable side walls, the side wall farthest from the intended position of the panel member having an overhanging locking shoulder along its outer edge defining with the opposite wall a relatively wide opening for said groove, the panel member having marginal self-locking means along different sides thereof cooperating with the grooves of said frame members when inserted therein, each of said locking means including two relatively yieldable, substantially flat flanges formed along its margins at an acute angle to each other, said flanges and grooves being arranged so that said flanges have wedge fitting engagement in said grooves by initial insertion of the apex of said flanges and the subsequent engagement of the free edge of each of the outer flanges in locking position beneath their respective locking shoulders by expanding tension of said flanges, and with the portions of said panel member adjacent the inner flanges extending laterally from said grooves so that pulling stresses acting on said panel member in a direction transversely of said flanges and grooves tend to increase the locking action of said outer flanges beneath their respective shoulders.

13. A composite structure comprising a panel and a cooperating connected member, the panel having an inner flange extending transversely of the panel and an outer flange extending at an angle thereto, said flanges being relatively yieldable and extending along the margin of the panel, the connected member having an outwardly facing groove, one wall of said groove having an overhanging shoulder engageable by the free end of said outer flange and flexing said outer flange toward the inner flange when the flanges are inserted in the groove, said flanges being at an acute angle to each other when so inserted, said shoulder also forming a locking abutment for the free edge of the outer flange and maintaining the inner flange against the opposite wall of the groove when the outer flange is pressed beyond said shoulder.

14. In a composite panel and frame structure, a panel, and a plurality of relatively rigid frame members therefor, each of said frame members having a groove formed therealong with opposed relatively non-yieldable side walls, each side wall farthest from the intended position of the panel having an overhanging shoulder therealong, defining with the opposed wall a relatively wide opening for said groove, the panel having a plurality of similar marginal locking means along different sides thereof, each comprising two relatively yieldable substantially flat flanges formed along its margin at an acute angle to each other and transversely of said panel, said flanges having wedge-fitting engagement in said grooves by the initial insertion of the apexes of said flanges and the subsequent engagement of the free edge of each of the outer flanges beneath said shoulders by expanding tension of said flanges.

HARVEY B. LINDSAY.

Certificate of Correction

Reissue No. 22,693. November 20, 1945.

HARVEY B. LINDSAY

It is hereby certified that errors appear in the printed specification of the above numbered patent requiring correction as follows: Page 3, second column, line 11, for "relation" read *relative*; page 5, first column, line 17, claim 3, for "mem-" read *members*; and that the said Letters Patent should be read with these corrections therein that the same may conform to the record of the case in the Patent Office.

Signed and sealed this 21st day of May, A. D. 1946.

[SEAL]

LESLIE FRAZER,
*First Assistant Commissioner of Patents.*